Oct. 13, 1964

C. E. DRUMHELLER 3,153,137

EVAPORATION SOURCE

Filed Oct. 13, 1961

INVENTOR
CARL E. DRUMHELLER

BY John R Hoherty

ATTORNEY 3,153,137
EVAPORATION SOURCE
Carl E. Drumheller, Pittsford, N.Y., assignor to Union Carbide Corporation, a corporation of New York
Filed Oct. 13, 1961, Ser. No. 145,016
2 Claims. (Cl. 219—271)

This invention relates generally to the vacuum evaporation of a sublimating material, in particular silicon monoxide, and more particularly is concerned with an improved evaporation source characterized by its high evaporation capacity and efficiency.

In the conventional process of vacuum evaporation, a substrate to be coated is placed in a vacuum chamber together with an evaporation source containing a charge to be evaporated. The charge is heated to a high sublimating temperature and a vapor beam is produced of sufficient intensity to coat the substrate. In most evaporation sources the charge to be evaporated is heated by use of a heating element embedded within the charge.

With this type of evaporation source, a major problem arises in that large temperature gradients exist between the regions of the charge closest to and those remote from the heating element. These large temperature gradients exist primarily because of the relatively low thermal conductivity of the charge and the high heat of vaporization required to evaporate the charge. In the region of the charge closest to the heating element, particle streaming may often occur because of high localized temperatures. Within the region remote from the heating element, a converse effect is realized in that comparatively low localized temperatures exist and vapors which pass through these regions have a tendency to lose some of their thermal energy, thus reducing the efficiency of the evaporation source. The problem of large temperature gradients can be somewhat minimized by limiting the size or dimensions of the charge, but these attempts seriously reduce the evaporation capacity of the source.

It is therefore the principal object of the invention to provide an improved evaporation source which has a high evaporation capacity and which is capable of more efficient operation. More specifically, another object is an evaporation source in which a vapor beam of maximum thermal energy is capable of being produced. Another object is an evaporation source in which the charge to be evaporated is capable of being heated to uniform temperatures throughout. Still another object is an evaporation source in which a constant rate of deposition can be attained. Still another object is an evaporation source which is simple in construction and which is economical to manufacture.

The invention by means of which these objects are attained is an improved evaporation source comprising an elongated generally cylindrical container having therein a charge to be evaporated and a heating element. The heating element is embedded in the charge and has a portion thereof protruding above the charge. The container is mounted on a base and a multiplicity of radiation heat shields are provided within the base and concentrically around the side walls of the container.

Figure 1:
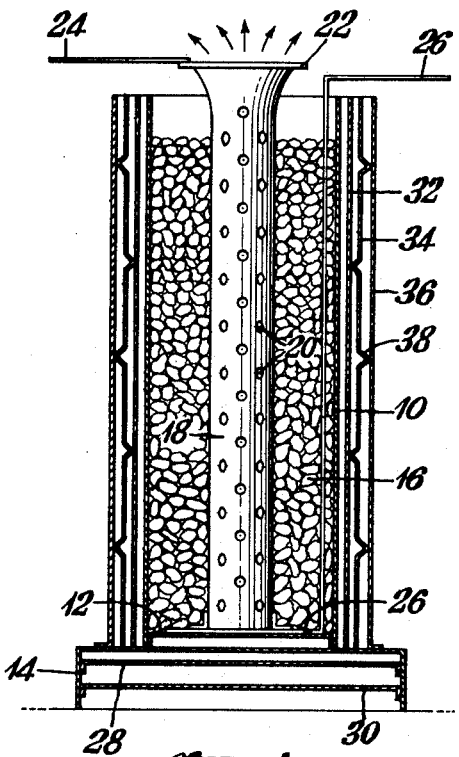
FIG. 1 is a vertical section of a preferred form of evaporation source embodying the invention.

Referring now to the drawing and particularly to FIG. 1 in which there is illustrated a preferred embodiment of the invention, an evaporation source includes an elongated generally cylindrical container 10 having a top open end and a bottom 12 mounted on a base 14. Within the container 10 is a granular charge 16 to be evaporated and embedded in the granular charge 16 is a vertical heating element 18.

The heating element 18 is tubular in shape and is perforated as at 20. The upper end 22 of the heating element 18 is conically shaped and protrudes above the top surface of the granular charge 16 at the top open end of the container 10. The heating element 18 at its upper end 22 has connected thereto a terminal 24 and at its lower end extends to the container bottom 12 and has there connected a terminal 26.

The evaporation source is operated by passing an electrical current through the heating element 18 from a power supply to which the terminals 24, 26 are connected. The resistance of the heating element is sufficiently high as to permit the granular charge 16 to be heated to a high sublimating temperature at which vapors are formed. The vapors in this construction pass into the perforated heating element 18 which provides a free passage for them in the granular charge 16. The vapors, when they enter the passage, receive additional thermal energy from the heating element 18 and then pass in a concentrated vapor beam out through the upper protruding end 22 of the heating element 18 as generally indicated by the arrows in the drawing. It will also be particularly noted in this construction that, because of the conical shape and the location of the upper heating element end 22, any cavity which has a tendency to form around the heating element 18 will necessarily be open at the top surface of the granular charge 16. Thus vapors which tend to escape out through the cavity, instead of being cooled down, scattered and lost, actually receive sufficient thermal energy from the hot heating element 18, and particularly from its upper protruding end 22, to be made use of in the evaporation process.

A series of radiation heat shields 28, 30 is provided within the base 14 and concentrically located around the side walls of the container 10 and mounted on the base 14 is a multiplicity of generally cylindrical heat shields 32, 34 and 36. These heat shields permit the granular charge 16 and its container 10 to attain a uniform temperature throughout and thus avoid large temperature gradients from being created. The shield 34 is preferably corrugated as at 38 to aid in spacing the shields around the container 10.

Figure 2:
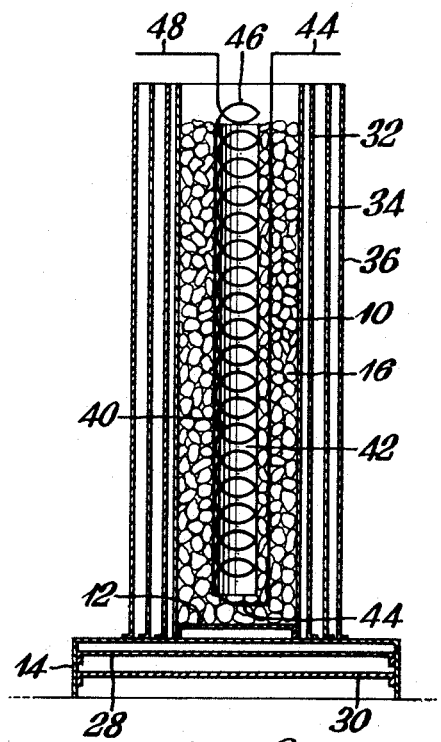
FIG. 2 is similar showing a modification of FIG. 1.

A modification of the evaporation source described is illustrated in FIG. 2. In the modification a helical filament 40 is utilized as the heating element. The helical filament 40 is embedded within the granular charge 16 in an elongated cavity 42 and at its lower end has a terminal 44. The upper end 46 protrudes above the top surface of the granular charge 16 and has a terminal 48. It will be apparent that the operation of this modified source is substantially the same as that described for the evaporation source of FIG. 1.

The long vertical shape of the container for the source is particularly important and makes it possible to provide an evaporation source having a high evaporation capacity. Thus with this configuration and with the heating element kept close to the container bottom, it will be noted that most any evaporation capacity as high as practicable can be attained by simply varying the total length of the container without any change in the character of the source. In addition to attain nearly complete evaporation of the granular charge, the diameter of the container is chosen just smaller than that of the terminal cavity which would be left after vaporization.

In practice the evaporation source is charged with a granular material to be evaporated which is packed firmly in the container for the source, taking particular care that no granules of the charge are placed inside the heating element. The particle size of the charge is important for maintaining a reasonably high rate of evaporation, and generally should be kept relatively small, a particle size of between 5 and 10 mesh being suitable, for instance. The source is placed in a vacuum chamber together with a substrate to be coated and its terminals are connected to a power supply. The supply current is regulated and the source is allowed to warm-up for several minutes until a uniform sublimating temperature is reached. In the instance when silicon monoxide is used as the charge material, a sublimating temperature of about 1300° C. should not be exceeded. An evaporation distance of between 50 to 80 centimeters is recommended, particularly when the substrate to be coated is optical glass and it is essential that the deposited coat be free of such imperfections as pinholes and the like. The source can be used until the charge is essentially exhausted, with only a thin shell remaining at the top. This shell can be broken and permitted to fall to the bottom of the container which can then be refilled without removing it from the vacuum chamber. It should be mentioned that in addition to attaining a uniform temperature throughout the charge, the radiation heat shields also make possible a more precise control of source performance and a shorter warm-up time to equilibrium temperature.

The evaporation source of the construction illustrated in FIG. 1 is preferred because of its ease of adaptability to operate at a constant rate of deposition. This characteristic is believed attributable in part to the substantially uniform distribution of vapors made possible by the perforated heating element which is utilized. In this connection, it will be particularly noted that the perforations are equally spaced in the heating element as shown in FIG. 1 and that substantially equal access for vapors is provided from most any part of the granular charge in the container. The size of the perforations is generally not too critical so long as a high rate of evaporation can be attained and the problem of particle streaming from the source is avoided. As an illustration, when utilizing a charge of granules having a size of about 10 mesh, a perforation size of approximately 0.02 inch diameter is suitable. A perforation density of about 25 holes per square centimeter is also recommended.

Figure 3:
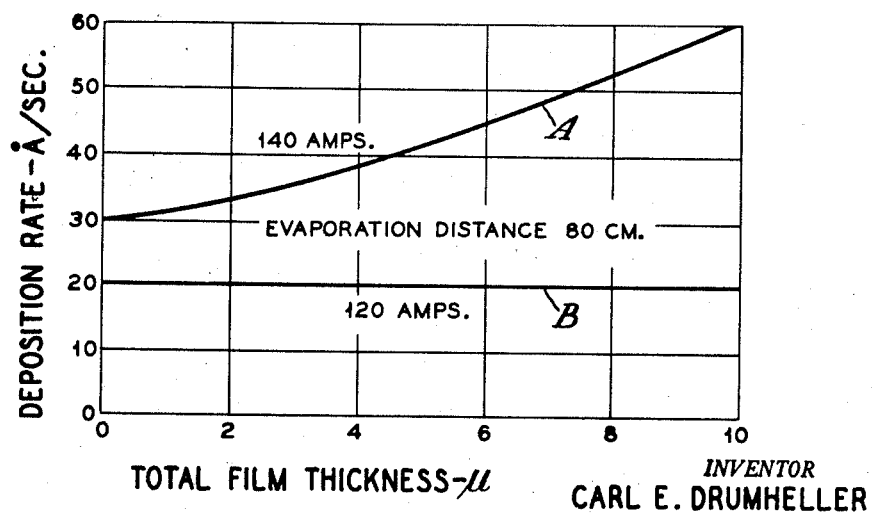
FIG. 3 is a group of curves representing the deposition rate characteristics of the evaporation source of FIG. 1.

The deposition rate characteristics for a typical evaporation source of the preferred construction and utilizing a granular charge of silicon monoxide is illustrated in FIG. 3. The curves shown are taken from data obtained for several different supply currents and for an evaporation distance of approximately 80 centimeters. It will be noted, when a sufficiently high current is used, the internal temperature of the charge gradually increases and results in a rise in the deposition rate as shown by the curve A. The ability of the source to compensate for the usual drop in evaporation rate as the charge is gradually depleted makes it possible to select a fixed operating current that will provide a constant rate of deposition as represented by the curve B. This constant deposition rate can be maintained throughout nearly the entire life of the charge to be evaporated.

The container for the source and its base, as well as the radiation heat shields and the heating element are constructed of a material which will not react with the vapors produced and which is capable of withstanding the high temperatures encountered. Tantalum metal is a preferred material. In the instance of the filament heating element, a tungsten filament wire has also been used successfully.

A number of evaporation sources embodying the principles of the invention have been constructed. As an illustration, an evaporation source of the construction of FIG. 1 was made which was charged with 125 grams of silicon monoxide. The container for the source was approximately 1 9/16 inches in diameter by 4 5/8 inches long, and was composed of tantalum. A perforated tantalum tube was used as the heating element and was fabricated from a 0.008 inch tantalum sheet. In another example, an evaporation source having a smaller capacity of about 20 grams was constructed. The container was approximately 1 inch in diameter by 2 inches deep, and was composed of tantalum. The heating element was a filament coil of about 11 turns per inch and was made from 0.04 diameter tungsten wire. This source exhibited a deposition rate of 10 to 20 Angstroms per second at an evaporation distance of 80 centimeters.

I claim:
1. An evaporation source comprising, in combination, an elongated generally cylindrical container having a top open end and a bottom mounted on a base, a tubular electrical heating element having an electrically insulated terminal on one end thereof adapted to be connected to an electrical power supply and a second terminal at the opposite end thereof adapted to be connected to a ground, and having perforations therein positioned within said cylindrical container and protruding above the top open end of said container, the tubular heating element defining a free passage for vapors and the tubular heating element and the cylindrical container providing a space therebetween adapted to contain therein a granular charge to be evaporated, the vapors of which can pass through the perforations of the tubular heating element and out through the free passage, and radiation heat shields in said base and concentrically located around said container.

2. An evaporation source comprising, in combination, an elongated generally cylindrical container having a top open end and a bottom mounted on a base, a tubular electrical heating element having an electrically insulated terminal on one end thereof adapted to be connected to an electrical power supply and a second terminal at the opposite end thereof adapted to be connected to a ground, and having perforations therein positioned within said cylindrical container and having a conically shaped end protruding above the top open end of said container, the tubular heating element defining a free passage for vapors and the tubular heating element and the cylindrical container providing a space therebetween adapted to contain therein a granular charge to be evaporated, the vapors of which can pass through the perforations of the tubular heating element and out through the free passage, and radiation heat shields in said base and concentrically located around said container.

References Cited in the file of this patent
UNITED STATES PATENTS

| | | |
|---|---|---|
| 1,712,403 | Ruggles | May 7, 1929 |
| 2,440,135 | Alexander | Apr. 20, 1948 |
| 2,612,432 | Body | Sept. 30, 1952 |
| 2,664,852 | Chadsey | Jan. 5, 1954 |
| 2,714,649 | Critzer | Aug. 2, 1955 |
| 2,762,722 | Truby | Sept. 11, 1956 |
| 2,772,318 | Holland | Nov. 27, 1956 |
| 2,848,523 | Hanks et al. | Aug. 19, 1958 |
| 3,017,851 | Krause | Jan. 23, 1962 |

OTHER REFERENCES
N6323V148b, Germany, May 3, 1956.